United States Patent Office 3,667,895
Patented June 6, 1972

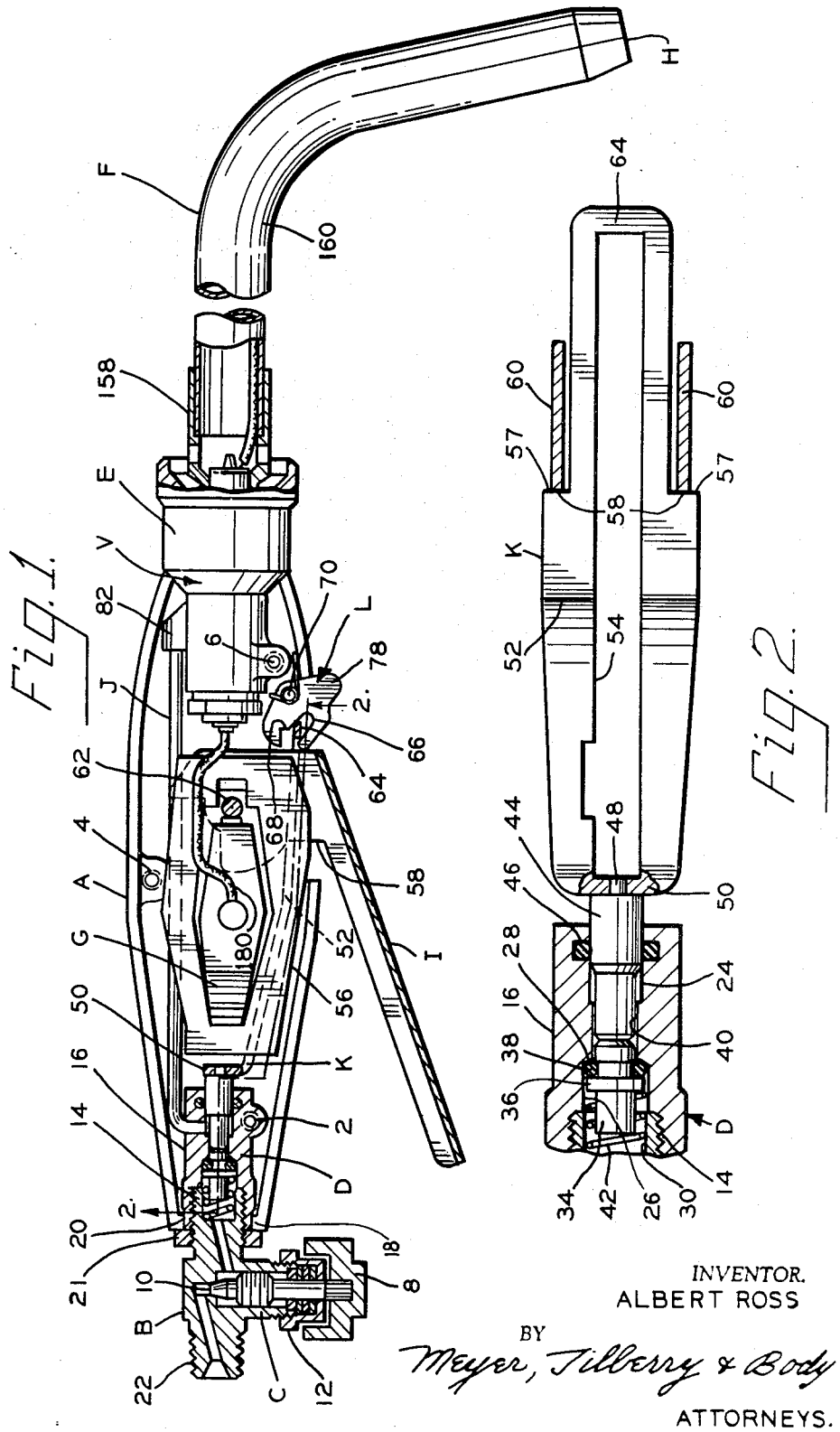

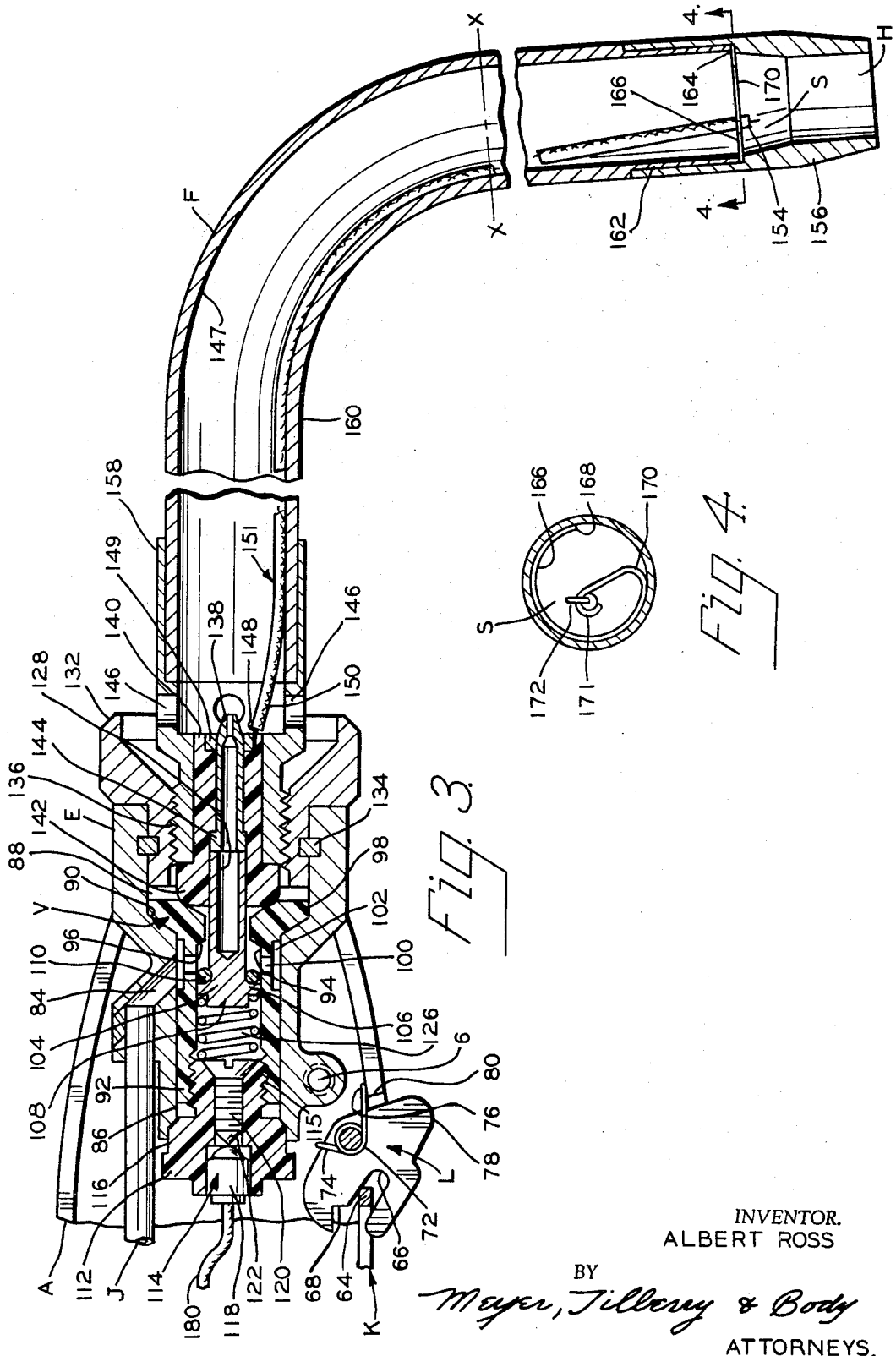

3,667,895
ELECTRICALLY IGNITED GAS TORCH WITH LAMINAR GAS FLOW IN REMOVABLE TIP
Albert Ross, Willowick, Ohio, assignor to Harris Calorific Company, Cleveland, Ohio
Filed Sept. 18, 1970, Ser. No. 73,577
Int. Cl. F23q 3/00
U.S. Cl. 431—255
14 Claims

ABSTRACT OF THE DISCLOSURE

A plumber's gas torch has a conventional flame-adjustment valve; in series with that valve, an on-off valve is lever-operated and is latched open automatically on operation of the lever. An electric igniter is actuated by the lever to ignite the torch simultaneous with opening of the on-off valve. Another series valve is automatically closed when the torch tip is unscrewed and is reopened as another tip is attached. A trigger releases the latch and allows the on-off valve to close under spring pressure. The electric igniter has a grounded metal frame, and the torch handle and connected parts are electrically conductive. The voltage generated by the ignition device is transmitted to a spark gap in the torch tip near the flame end thereof by a series of conductors insulated from the handle and torch tip, and including an insulated conductor wire lying in the torch tip adjacent the wall. Several diameters upstream of the spark gap and also the flame end, the insulated conductor leaves its position against the torch tip wall and is spaced therefrom so as not to interfere with laminar flow of the combustible gas and air mixture approaching the flame, thus avoiding an unstable flame which would result from turbulent flow.

RELATED APPLICATIONS

This application is related to my application Ser. No. 73,576 filed Sept. 18, 1970 which claims certain subject-matter at least partially disclosed but not claimed herein.

BACKGROUND OF THE INVENTION

(1) Field of the invention

This invention pertains to the art of electrically ignited gas-burning torches and more particularly to torches used for soldering and brazing operations ("plumbers' torches") and the invention will be described with particular reference thereto; however, it will be appreciated that the invention may have broader applications although many of the problems in soldering and brazing work are peculiar to such applications and are not generally found in many industrial applications.

(2) Description of the prior art

It has been the practice in plumbing operations to use a gas torch having a single, screw-operated, valve at the back end of the handle which serves as a shut-off valve and also a means to adjust the flame. Conventionally, the user connects the torch with the hose of a pressure-regulator which in turn is connected with a cylinder or bottle of gas.

Having connected the torch, with its valve closed, to the hose and having pressurized the hose, the user or operator holds a friction sparking device in the vicinity of the flame end of the torch tip, opens the valve, and ignites the flowing gas by means of the sparking device. He then puts the sparking device down somewhere, adjusts the flame by means of the valve, and proceeds to apply the torch flame to the work at hand.

When he has finished soldering or brazing the fitting or fittings he started with, he may lay the torch down, flame up, while he prepares the next torch application; or, if such preparation is likely to take a while, he probably turns the valve on the torch handle off to save gas and to prevent his coming into accidental contact with the torch flame. When he is again ready for heat, he looks around for and eventually locates the sparking device, and the cycle of ignition and flame adjustment starts all over again. Or he may lay the burning torch down "for just a minute" in the expectation that his preparation for the next heat application will be brief. Then, finding that he has to go to his truck for something, he probably turns the gas valve off to save gas and to prevent burning the building down.

In conventional torches, users have problems with flame stability, and the operator or user must periodically adjust the only valve, at the back end of the handle, to maintain the flame in its desired shape, color, length, etc.

Such time-wasting lost motion is expensive and the constant relighting of the torch irritating.

There now are some prior art piezoelectric crystal-ignited torches having lever-operated shut-off valves, in which the on-off valve is in series with and independent of the flame adjusting valve. However, such torches require a continuous grip on the handle to keep the on-off valve open, and this results in two serious drawbacks: (1) Fatigue, especially in the form of cramping of the hand and arm muscles; and (2) Awkwardness in use of the torch because the type of work requires a large amount of manipulation in order to direct the flame to a fixed installation which seldom lends itself to a convenient hold of the torch and the lever.

It is accordingly an object of this invention to provide a gas torch which will eliminate much of the lost motion that is routine with high-priced labor using conventional gas torches.

It is another object of this invention to provide a gas torch which enables the user to turn off the flame without disturbing the flame adjustment so that re-ignition of the flame instantly provides the same flame the user had when he shut the torch off.

A further object is to provide a torch which is easily ignited so that users will be encouraged to turn the torch off instead of leaving a burning torch unattended.

It is yet another object to provide a torch with an operator-operable shut-off valve and a self-contained ignition system, which the operator can use without keeping a cramp-inducing grip on the torch and which allows free manipulation of the torch into whatever attitude may be required to put the flame exactly where the operator wishes to put it.

A still further object is a torch design that promotes laminar flow of the gas-air mixture as the mixture nears the flame, to insure a steady and stable flame.

SUMMARY OF THE INVENTION

In accordance with the invention, a torch with a piezoelectric ignition system has an on-off valve in series with a flame adjusting valve, and operator-operable means controlling the igniter and the on-off valve. The piezoelectric device generates a voltage which is transmitted to a spark gap near the flame end of the torch tip, by a series of electrically conductive elements insulated from the metal handle and the torch tip, many of which serve a dual role by providing a gas circuit and an electric circuit simultaneously. An easily removable and replaceable torch tip engages valve elements in the handle forming a third gas valve that is spring-biased closed with the torch tip removed; attachment of a torch tip automatically opens the third valve to establish a gas circuit and an electric circuit. The electric circuit includes the spark gap, and an insulated conductor secured in and immediately adjacent the torch tip wall. Several diameters before reaching the flame end of the torch tip, the insulated conductor leaves the wall and is spaced therefrom to permit laminar flow of gas to the flame, thus insuring a stable and steady flame.

THE DRAWINGS

The invention may take physical form in certain parts and arrangements of parts, a preferred embodiment of which will be described in detail in this specification and illustrated in the accompanying drawings which form a part hereof and wherein:

FIG. 1 is a side view of a torch made according to this invention, with one side of the handle removed and with parts broken away and in section.

FIG. 2 is a view in detail of the actuator for the on-off valve, and part of the operator-operable lever, being a view substantially on line 2—2 of FIG. 1.

FIG. 3 is an enlarged view, with parts broken away and in section, of the front portion of the handle to show how the torch tip is attached to the handle, and to show details of the third valve and the electrical connection made through the third valve.

FIG. 4 is a view in section substantially on line 4—4 of FIG. 3.

Referring now to the drawings in more detail, wherein the illustrations are for the purpose of setting forth the preferred embodiment of the invention only, and not for the purpose of limiting same, the figures show a handle A of a gas torch, the rear end of which carries a fitting B in which there is provided a flame adjusting valve C and an on-off valve D. An element E secured to the forward end of the handle is adapted for easy attachment with respect to a torch tip F. The element E has secured within it a valve indicated generally at V which is adapted to make or break both a gas circuit and an electric circuit between the element E and torch tip F as these two elements are engaged or disengaged respectively. The torch carries a self-contained electric ignition system including a piezoelectric device G for generating an electric voltage to provide an igniting spark to jump across a spark gap S within the torch tip F and near the open end thereof, said open end being indicated at H. A lever I is pivotally mounted on handle A and serves as operator-operable means to actuate both the on-off valve D and the piezoelectric device G. Suitable conduit means J are provided to complete a gas circuit from the body of the valve D to the element E. An actuator K is provided in the handle, and at the left end of actuator K as seen in FIG. 1, the actuator engages the movable valve element of on-off valve D. Intermediate the ends of actuator K, the actuator is engaged by the operator-operable means I. At its right end as seen in FIGS. 1 and 3, actuator K cooperates with a latch indicated generally at L.

Referring now to the drawings in greater detail, it will be understood by those skilled in the art that the handle A is preferably of metal and is preferably in two parts, split along the plane of the paper as seen in FIG. 1. Threaded openings 2, 4, and 6 are preferably provided to receive the threaded ends of holding devices such as conventional cap screws passing through suitable openings in the removed half of handle A, which is shown removed in FIG. 1 to expose the details of the torch to the observer for a more easily understood description of those details. Handle A provides the basic support for the remaining elements of the torch.

Thus, handle A carries at its rear end a fitting B wherein there is provided a conventional flame-adjusting valve indicated generally at C and having a suitable handle 8 secured to a metering valve element 10 which cooperates with the body of the fitting B to permit an infinite variation of gas flow through the valve C so that the operator can adjust the torch flame to suit the particular job. A packing gland nut 12 is provided in the flame-adjusting valve C, and includes means for accomplishing the usual fluid seal function, as well as means for applying a variable resistance to the turning of the stem on which handle 8 is secured, thus assuring that the handle 8 will remain in the position to which it is adjusted by the operator, rather than moving out of adjustment because it may be accidentally brushed against the user's body, or against some item of equipment, or the floor, or the like.

Flame-adjusting valve C and on-off valve D are joined by a threaded engagement indicated at 14. More specifically, the valve body 16 on-off valve D is secured in the back end of handle A by an internal flange 18 of handle A engaging a reduced diameter surface 20 on valve body 16 and by cap screws engaging both ends of threaded opening 2. A lock nut 21 secures fitting B and valve body 16 against disengagement. The extreme left end of fitting B as seen in FIG. 1 is threaded as shown at 22 to cooperate with an internally threaded hose fitting which is adapted to be secured to the fitting B to provide gas under pressure for the operation of the torch.

The right end of valve body 16 is provided with a longitudinal bore 24 which communicates directly with a larger longitudinal bore 26 to provide a shoulder 28 at their junction plane, the shoulder 28 preferably being conical in form as shown in the illustrated preferred embodiment. A bore 30 in the right end of fitting B cooperates with the bores 26 and 24 to form a recess which is generally cylindrical in configuration to receive the longitudinally movable parts of the on-off valve D. Thus, in the preferred embodiment shown, a valve element 34 is shown as being provided with a flange 36. To the right of flange 36 as seen in FIGS. 1 and 2, element 34 is grooved slightly to receive an O-ring 38 which cooperates with the shoulder 28 and the flange 36 to seal the fluid passage through the bores 26 and 24. In the preferred embodiment shown, bores 24 and 26 are joined by a slightly smaller diameter bore 40 to provide a greater seating area of shoulder 28 for engagement of the O-ring 38.

A helical spring 42 lies largely in the bore 30, seating at its left end in the end of the bore and seating at its right end against the left face of flange 36, to bias the valve element 34 toward the right into valve closed position.

The right end of valve element 34 lies in the smaller diameter bore 40 referred to above, and is adapted to abut against a plunger 44 which extends out through the right end of the valve body 16, being suitably packed by a fluid seal such as an O-ring 46. The extreme right end of plunger 44 carries a reduced-diameter projection 48 which engages a corresponding hole in the left end of the valve actuator K, so that the shoulder formed by projection 48 allows the plunger 44 to abut against the left end of actuator K for movement of plunger 44 by actuator K toward the left against the bias of spring 42.

Actuator K may take any suitable shape, but in the preferred embodiment shown, the actuator is a closed and bent loop of metal, the left end of which abuts against plunger 44, designated by 50, being bent at almost right angles to the remainder of the actuator loop, said loop having a slight bend at 52 to conform to the shape of the handle in which it lies. The loop forms an elongated opening shown at 54 to receive the lower portion of a frame 56 as seen in FIG. 1 of the piezoelectric igniter device. Igniter device G is a source of voltage produced by the distortion of crystals, and is disclosed and claimed in Patent 3,469,119, issued Sept. 23, 1969 to D. B. Parkinson, and assigned to the Clevite Corporation, a corporation of Ohio. In view of the disclosure in the Parkinson patent, no discussion of the details of the voltage source is necessary.

The actuator K is provided with shoulders 57 on each side of the closed loop, said shoulders being adapted to have abutting engagement with the edges 58 of substantially parallel flanges 60 which are formed integral with and constitute a part of the lever I. Flanges 60 cooperate with pivots 62 which turn in openings in the two halves of handle A. The two pivots may be formed in any suitable conventional manner, but in the preferred embodiment shown, they are joined as one to form a shaft, the portion between the pivot-forming ends serving as the element to engage the crystal for applying pressure thereto as disclosed in the above-identified Parkinson patent.

At its extreme right end as seen in FIGS. 1 and 2, the closed loop forming the actuator K embodies a cross-member 64 which may be referred to as a latch-engaging tip in view of its role in the latching function. Latch-engaging tip 64 is adapted to be received in a recess 66 of latch L, recess 66 also incorporating a shoulder 68 which is adapted to engage the right end of tip 64 in abutting relationship in the latched position of the several parts. At its opposite sides, the latch L carries a pair of aligned stub shafts or pivots, one of which is shown at 70, and which are received in appropriate openings in the two halves of handle A. A suitable torsion spring 72 preferably makes one complete wrap around at least one of the stub shafts 70, having one end 74 engaging the upper edge of the latch L and another end 76 engaging an internal surface of the handle A, the arrangement of spring 72 being such that the spring biases the latch L counter-clockwise as viewed in FIGS. 1 and 3. The trigger-like projection 78 on latch L extends out of the handle through a slot 80 provided for that purpose.

Element E is secured in the forward end of handle A by means of threaded members extending through suitable openings in the two sides of handle A and engaging threaded openings in the fitting E, such as the one shown at 6 and described above. Gas conduit J is engaged by a socket 82 in element E, and communicates with a fluid passage 84 provided in the element. In the preferred embodiment, element E is provided with a stepped bore having two sizes as shown at 86 and 88. The two openings 86 and 88 join at a shoulder 90 which is preferably conical in configuration. Because of the self-contained electrical igniter, the element E is preferably electrically conductive. An electrically non-conductive element 92 is disposed in the longitudinal bore of conductive element E. Non-conductive element 92 is also provided with a longitudinal bore 94 which is substantially coaxial with the longitudinal bore of element E. It will be noted that bore 94 is open at both ends of element 92, and adjacent one end of the bore, a shoulder 96 is provided for a purpose to be described hereinafter. A flange 98 at one end of element 92 lies in the large portion 88 of the bore in element E and is adapted to engage the conical shoulder 90 referred to above. A plurality of radial bores 100 are arranged in an external groove 102 in element 92 and serve to communicate conduit J with bore 94 by way of fluid passage 84 in element E, groove 102 in element 92, and radial bores 100 in element 92.

An electrically conductive element 104 is mounted to reciprocate in the bore 94, and is provided with a flange 106 adjacent its end 108. A fluid seal such as an O-ring 110 is provided adjacent the flange 106, between the flange and the shoulder 96, so that movement of valve element 104 to the right as seen in FIG. 3 compresses the O-ring 110 between flange 106 and shoulder 96 to effect the desired fluid seal. It will be noted that, in the valve-closed position in which the O-ring 110 is in tight engagement with shoulder 96, the O-ring is on the downstream side of the radial bores or passages 100, thus effectively sealing the fluid conduit J against further flow of gas when valve element 104 is in the valve-closed position.

The left ends of bored elements E and 92 engage a non-conductive bushing 112 which secures an electrical terminal indicated generally at 114 and comprised of a plurality of parts as will be hereinafter detailed. Thus, non-conductive bushing 112 is externally threaded as at 115 to engage a corresponding internal thread in the non-conductive element 92; a larger and unthreaded surface 116 engages a suitably shaped counterbore in the extreme left end of element E. Bushing 112 is provided with a stepped and substantially central bore to receive the electrical terminal in its several parts consisting of a terminal button 118 in the very end of bushing 112 and a conventional flat-head screw 120 having a pointed tip 122 in electrically conductive contact with terminal button 118. Screw 120 has external threads in engagement with co-operating internal threads in the bushing 112. A spring 126 is seated at its left end against the flat head of screw 120 and at its right end engages the closed end 108 of valve element 104, and thus serves to bias the valve element 104 toward its valve-closed position.

Reference was made above to the closed end 108 of valve element 104. To the right of a plane adjacent to O-ring 110, valve element 104 is provided with a longitudinal bore 128, and a plurality of radial bores 130 communicate the longitudinal bore 128 at its left end with longitudinal bore 94 and radial bores 100 in non-conductive element 92.

As described briefly above, a torch tip F is coupled with element E in any suitable manner, as, for example, by a nut 132 held in the open end of element E by a snap ring 134. Nut 132 is internally threaded as shown at 136 to cooperate with the externally threaded end of torch tip F. A gas-mixing nozzle 138 is secured in the bore of said threaded end of torch tip F. Mixing nozzle 138 is electrically conductive and is held in the end of the torch tip by means of a non-conductive sleeve 140, sleeve 140 having a head 142 outside the bore of the torch tip and abutting against the end thereof. Sleeve 140 is provided with a stepped bore having a larger diameter at the head end than at its opposite end, the two different diameters forming a shoulder against which a flange 144 on nozzle 138 abuts in order to keep nozzle 138 from being pushed out of the bore to the right as seen in FIG. 3. The larger diameter portion of the stepped bore in which flange 144 lies is of a size adapted to form a slip fit with the external surface of the longitudinally bored end of valve element 104. More specifically, in the assembled relationship of torch tip F and element E, head 142 of sleeve 140 engages flange 98 of non-conductive element 92 with the bored end of valve element 104 lying in the large diameter portion of the bore of sleeve 140, the open end of valve element 104 being in electrically conductive contact with the flanged end 144 of mixing nozzle 138. Closely adjacent to its handle end, torch tip F is provided with a plurality of radial air inlet passages 146 lying substantially in a plane in contact with the discharge end of mixing nozzle 138, and communicating with the fluid passage 147 of the torch tip immediately downstream of sleeve 140.

Reference was made above to the fact that the mixing nozzle 138 is electrically conductive. A conductor of electricity in the form of a bare wire 148 is in electrically conductive contact with mixing nozzle 138. In the preferred embodiment shown, this is accomplished by compressing a short length of the bare wire between the external surface of nozzle 138 and the surface of the bore of sleeve 140 in the vicinity of the nozzle discharge end of that sleeve. The right end of sleeve 140 is counterbored to receive a metal collar 149 which engages bare wire 148 and holds it in place in sleeve 140. As the wire extends outward away from the immediate vicinity of sleeve 140, it is surrounded by a layer of insulation 150 to become an insulated conductor 151, conductor 151 being secured in any suitable way to the inner wall of fluid passage 147 of torch tip F. As the insulated conductor 151 approaches the flame end 152, namely at a plane X—X transverse to the direction of flow in the torch tip, insulated conductor 151 begins to leave the wall of the torch tip, until it is substantially spaced from the wall at its end 154 just inside the extreme open end or flame end H of the torch tip. The insulation 150 stops just past the end 154 so that the extreme end is exposed, or "bare."

For the purpose of maintaining a stable flame at the open end of the torch tip, it is desirable that the gas flow be laminar as the gas approaches the flame. If conductor 151 were to lie immediately adjacent the inner wall of the torch tip at its closest point to the flame, the resulting shape of the fluid passage would be such as to encourage turbulent flow of gas in the passage, making for an unstable condition in the flame. To avoid such instability in the gas flow and in the resulting gas flame, the end 154 of conductor 151 is spaced from the inner wall as shown in FIGS. 3 and 4 of the drawing. Such spacing can be accomplished in a number of ways, but in the preferred embodiment shown, the end 154 is spaced from the inner wall of the torch tip by means of a conductive support which engages the insulated covering 150 of insulated conductor 151 at the end 154 and is in conductive contact with the electrically conductive torch tip F, which at its outer end includes a piece which is here shown as a flame-supporting nozzle 156 secured to and forming a portion of the end of torch tip F. More specifically, fluid passage 147 is provided by a threaded coupling end 158, a gas tube 160, and the flame-supporting nozzle 156. The gas tube 160, in the preferred embodiment shown, carries a reduced-diameter portion 162 near its outer end, which engages a suitably-sized bore in the flame-supporting nozzle 156 and preferably, the bore in flame-supporting nozzle 156 terminates in a shoulder 164. The preferred embodiment of the spacer for the end of the ignition wire comprises a loop 166 of resilient wire which need not form a complete circle. As shown, loop 166 lies between the end of the tube 160 and the shoulder 164; it begins at a point indicated at 168, and approximately two-thirds around the bore from the starting point 168, wire 166 bends inward at 170 toward the center of the gas tube 160 where it terminates in a loop 171 around insulation 150. Spark gap S is thus provided between the bare end 172 of conductor 151 and either wire 166 or the inner wall of tube 160 or both. The end 154 need not be at the exact geometric center of the gas tube, but should be spaced for enough from the wall to insure a shower of sparks from the bare exposed end 172 of the ignition wire and to permit laminar flow of gas approaching flame end H.

The determining factors for the location of plane X—X are: First, providing laminar flow of gas in the approach to the flame so as to produce a maximum of stability in the flame itself; and second, provide adequate physical support for conductor 151. Plane X—X may be disposed from 4 to 6 diameters back from the very end of the flame-supporting nozzle 156, and in the preferred embodiment shown, plane X—X is 5 diameters upstream from the discharge end of torch tip F.

OPERATION

In operation, assuming that the torch is connected with a source of combustible gas at a suitable pressure, and that the flame-adjusting valve C is open, the operator or user of the torch squeezes the handle so as to actuate the lever I toward the handle. In so doing, the user distorts the piezoelectric crystal of the device G, as is explained in the above-identified Pat. 3,469,119 to Parkinson, and a voltage is generated by the device G. Because the frame of device G is grounded, it will suffice to trace the electric circuit for the ignition system by starting with the cable 180 which is provided with the device G. As shown in FIG. 1, cable 180 is an insulated electrical conductor, which ends in the terminal assembly comprising the terminal contact 118 and the flat head screw 120. From the head of the screw, the electric circuit is traced through spring 126, valve element 104, mixing nozzle 138, the bare end 148 of a wire which is covered with insulation 150 throughout the major portion 151 of its length. Moreover, insulated conductor 151 is adequately supported physically by being in direct contact with the inner wall of gas tube 160 to a plane approximately 5 diameters from the discharge end of the torch tip. At this point, insulated conductor 151 beings to lead away from the inner wall of the gas tube to a spacer where the end 154 of the insulated wire terminates in a bare and exposed electrical conductor 172 pointed toward the wall of the torch tip F, the spacer consisting of a loop of wire 166 bent away from the tube inner wall at 170. The voltage quickly builds up to a great enough value to cause a shower of sparks to jump across the gap between the end of wire 172 and the inner wall of the torch tip F or wire 166, or both. As always in such cases, the spark takes the path of least resistance; in practice, this results in a shower of sparks because several paths of substantially equal resistance are available.

Meanwhile, as lever I turns about the pivots 62, in a clock-wise direction as seen in FIG. 1, the parrallel flanges 60 on the lever I having edges 58 in engagement with the shoulders 57, push the actuator K toward the left as seen in FIGS. 1 and 2. The end 50 of actuator K abuts against the plunger 44 and forces it to the left against the bias of spring 42, moving the valve element 34 from the valve-closed position shown in the figures to a valve-open position, whereupon fluid flows through the flame-adjusting valve C, to the large bore 30 in fitting B. Gas flows around flange 36 and around and past the O-ring 38, into the bore 24 and into conduit J. From the end of conduit J in socket 82, gas flows through the passage 84, through the radial bores 100 in the non-conductive element 92, through radial bores 130 and into longitudinal bore 128 of valve element 104. Gas flows into and through mixing nozzle 138, which terminates in the plane of radial bores 146 which admit air into the torch tip F. The mixture of air and combustible gas flows through the torch tip, and in the straight portion from plane X—X to the very outer end H of the torch tip, the gaseous mixture begins to assume a laminar flow until it reaches the bare end 172 of the ignition wire where the shower of sparks ignites the gas and a flame forms at the outer end H of the torch tip.

Once a flame, adjusted as desired, is in operation, a steady-state condition is soon established, and laminar flow of gas takes place in the approach to the flame, assuring a steady and constant flame such as could not exist if the gas flow were turbulent as the mixture approached the flame.

Latch engaging tip 64 is, of course, an integral part of the actuator K, so that as actuator K moves to the left as seen in FIGS. 1 and 3 to open the on-off valve D, tip 64 moves far enough to the left so that torsion spring 72 may rotate latch L in a counter-clockwise direction, whereupon shoulder 68 is in a position to engage the right edge of latch engaging tip 64 as soon as the operator or user of the torch releases his pressure on lever I. Spring 42 in the on-off valve D will then keep enough tension on the actuator K, pushing latch-engaging tip 64 tightly against the shoulder 68, which by this time is below the line of force from the center of element 48 on plunger 44 to the axis of the pivot 70 of latch L. The latch L will remain in the latched position, holding the on-off valve D open. The flame is now established because the on-off valve is open and the user then adjusts the flame to whatever type or size flame he wants by manipulating handle 8 of the flame-adjusting valve C. Because the on-off valve is held open by the latch, the operator is free to hold the torch handle A in any position he wishes without regard to any need to maintain the lever I in any position, so that he can let the lever I assume the position shown in FIG. 1 of the drawings. In fact, even if the user should actuate lever I again, or hold it pressed against the handle, or in an intermediate position, it will not affect operation of the torch, because the on-off valve D is held open by the latching means. Moreover, the hand which holds the torch need not assume a cramp-inducing position, so that hand and arm muscles will not become cramped due to the fatigue which would follow from the necessary effort to keep the on-off valve D in the open position. As a result, operator fatigue is virtually eliminated. When the operator wishes to shut the valve D off to shut off the torch, all he needs to do is engage the trigger projection 78, moving it toward the rear of the torch, whereupon the latch is disengaged and spring 42 is allowed to return the valve element 34 to its valve-closed position.

If the user or operator decides that he needs a different torch tip because of a different type of job, he disengages torch tip F from the element E by turning either the torch tip itself or nut 132 in order to disengage the nut and the torch tip at their threaded engagement. As these two parts are unscrewed, the mixing nozzle 138 is moved away from valve element 104, so that spring 126 is able to move the valve element toward the right as seen in FIG. 3, namely, to its valve-closed position in which the O-ring 110 is pressed between the flange 106 and the shoulder 96, whereupon flow through the longitudinal bore 128 of valve element 104 is completely blocked, even if the on-off valve D should be open.

The invention has been described with reference to the preferred embodiment. Obvious modifications and alterations will occur to others upon their reading and understanding of this specification. It is my intention to include all such modifications and alterations insofar as they come within the scope of the appended claims or the equivalence thereof.

What is claimed is:

1. In an electrically-ignited gas torch having a gas circuit and an electric circuit and including a plurality of elements which function in both circuits, comprising: an operator-operable voltage source; a conductive gas conduit having an open end adapted to support a gas flame; an insulated wire in said conduit and having a bare outer end; and means spacing said bare end from the inner wall of said conduit adjacent said open end, said spacing means being a conductive thin wire component having a first portion extending generally circumferentially of and in electrical contact with said conduit and a second portion extending into said conduit and into supporting engagement with said insulated wire.

2. A torch as in claim 1 provided with a handle, wherein the conduit is readily removable from the handle, and valve means in the handle actuable by removal of the conduit from the handle to close the gas circuit.

3. A torch as in claim 2, wherein the valve includes an electrically conductive element, and an electrically conductive element in the conduit adapted to make electrical contact with said electrically conductive element of the valve upon attachment of the conduit to the handle and to break said contact upon valve closure by removal of the handle.

4. A torch as in claim 1, wherein said conduit includes circumferentially extending recess means, said first portion of said spacing means being disposed in said recess means.

5. A torch as in claim 1, wherein said bare outer end of said insulated wire is bent toward said inner wall of said conduit.

6. In an electrically ignited gas torch: a circuit for gas under pressure comprising a conduit connectable to a source of gas under pressure, an electrically conductive element secured to the conduit and having a first bore connected with said conduit, an electrically non-conductive element having a second bore and a valve seat-providing shoulder in said second bore and in fluid communication with said conduit, said non-conductive element disposed in said first bore, an electrically conductive tubular valve element reciprocable in said second bore and cooperable with said shoulder to block fluid flow from said conduit through said second bore, said valve element having a longitudinal bore in one end and a radial bore communicating with said longitudinal bore and movable from a position in which fluid flow is blocked as aforesaid to a position in which fluid may flow from said conduit through said longitudinal bore, an electrically conductive torch tip having a fluid passage throughout its length, means for removably interengaging said tip and said electrically conductive element, a non-conductive sleeve in one end of the fluid passage of said tip and having a central bore adapted to receive said one end of the valve element, and an electrically conductive mixing nozzle secured in said central bore of said sleeve and adapted to be in electrically conductive contact with said one end of the valve element when the tip and said electrically conductive elements are assembled, said sleeve and non-conductive element having ends disposed in sealing engagement radially outwardly of said one end of said valve element when said tip and said electrically conductive element are assembled, and an electric circuit for an ignition current comprising the aforesaid conductive elements and nozzle, electric conductor means in conductive contact with the nozzle and non-conductive contact with most of said fluid passage, and means to space said conductor means from contact with the wall of said tip at the outer end of said conductor means and near the open end of said fluid passage.

7. A gas torch as in claim 6, wherein said conductor means is a wire and wherein the extreme outer end of said wire is bare and is bent toward the wall of said tip.

8. A gas torch as in claim 7, wherein said wire spacing means is electrically conductive and is in electrically conductive contact with said tip and in non-conductive contact with said wire.

9. A gas torch as in claim 8, wherein the inner end of said wire is tightly engaged between the sleeve and the mixing nozzle.

10. A gas torch as in claim 6, wherein said conductor means is a wire, and wherein said spacing means is electrically conductive and is in electrically conductive contact with said tip and in non-conductive contact with said wire.

11. A gas torch as in claim 10, wherein the inner end of said wire is tightly engaged between the sleeve and the mixing nozzle.

12. A gas torch as in claim 6, and a spring biasing the valve element into engagement with said shoulder to block fluid flow when said torch tip is removed from engagement with said electrically conductive element and into electrically conductive contact with said nozzle when the torch tip and said electrically conductive element are assembled.

13. A gas torch as in claim 6, wherein said means for removably interengaging said tip and said electrically conductive element includes threaded coupling means operable to move said sleeve toward said non-conductive element free of relative rotation therebetween to achieve sealing engagement between said ends of said sleeve and said non-conductive element.

14. A torch tip as in claim 10, wherein said spacing means is a conductive thin wire component having a first portion extending generally circumferentially of and in electrical contact with said tip and a second portion extending into said fluid passage and interconnected with said wire defining said conductor means.

References Cited

UNITED STATES PATENTS

| | | | |
|---|---|---|---|
| 2,888,066 | 5/1959 | Wilson | 431—255 |
| 3,155,140 | 11/1964 | Wilson | 431—255 X |
| 3,255,803 | 6/1966 | Hach et al. | 431—255 X |
| 3,436,164 | 4/1969 | Deucher | 431—255 |

EDWARD G. FAVORS, Primary Examiner

U.S. Cl. X.R.

431—345